United States Patent
Hallenstvedt

[19]

[11] Patent Number: 6,053,502
[45] Date of Patent: Apr. 25, 2000

[54] SEAT FOR A SEALING RING

[75] Inventor: Oddbjörn Hallenstvedt, Valskog, Sweden

[73] Assignee: AB Volvo Penta, Gothenburg, Sweden

[21] Appl. No.: 08/372,126

[22] Filed: Jan. 13, 1995

[51] Int. Cl.[7] .................................................. F16J 15/32
[52] U.S. Cl. ........................................ 277/572; 277/551
[58] Field of Search ...................................... 277/152, 153, 277/178, 551, 572

[56] References Cited

U.S. PATENT DOCUMENTS

| | | | |
|---|---|---|---|
| 2,830,858 | 4/1958 | Moorman et al. | 277/153 |
| 3,573,871 | 4/1971 | Warner | 277/152 |
| 4,776,768 | 10/1988 | Kondoh | 277/59 |
| 4,910,987 | 3/1990 | Woodrow | 277/152 |

FOREIGN PATENT DOCUMENTS

| | | | |
|---|---|---|---|
| 460366 | 12/1991 | European Pat. Off. | 277/152 |
| 3734149 | 6/1989 | Germany | 277/153 |

*Primary Examiner*—Daniel G. DePumpo
*Attorney, Agent, or Firm*—Young & Thompson

[57] ABSTRACT

A sealing ring seat disposed in a housing. The seat has an inner lateral surface, against which an external surface of an elastic outer ring of the sealing ring is intended to lie. The lateral surface of the seat has a peripheral groove with a sharp edge which secures the sealing ring against being pressed out of the seat when there is overpressure in the housing.

13 Claims, 1 Drawing Sheet

FIG. 2
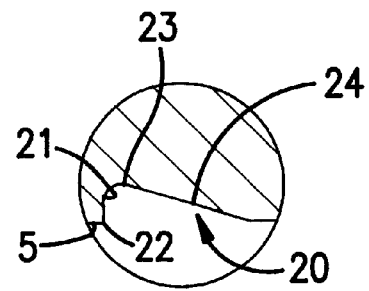
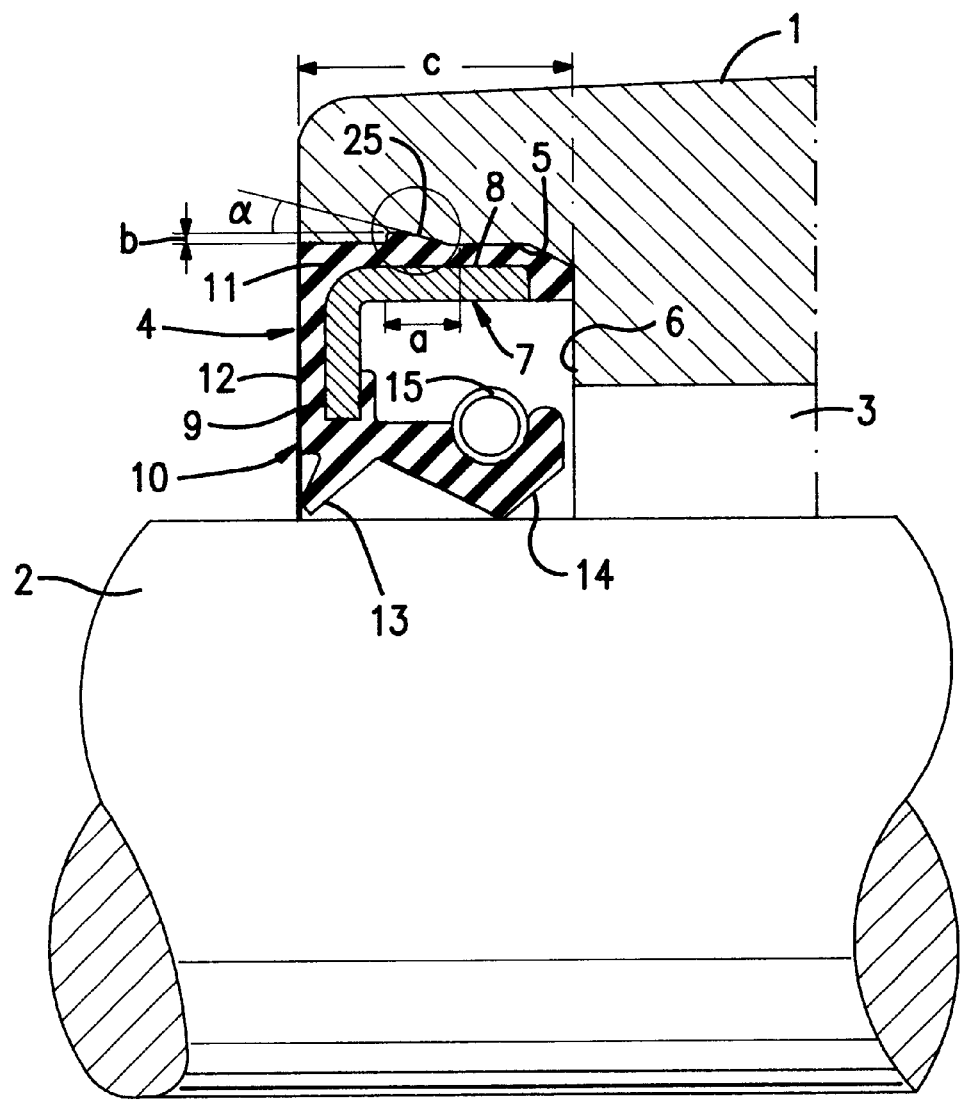
FIG. 1

SEAT FOR A SEALING RING

The present invention relates to a seat for a sealing ring, comprising a ring of stiff material surrounded by a ring of elastic material, said seat having an internal lateral surface against which an external lateral surface on the ring of elastic material is intended to lie.

Sealing rings or so-called stuffing boxes, which are used to provide a seal between a shaft and a surrounding housing, for example the housing and the output shaft in a transmission, must be secured axially in some manner in the seat in the housing to prevent an overpressure in the interior of the transmission housing from forcing the sealing ring out from its seat. Known devices for axially fixing a sealing ring include a lock ring in a groove or a cover outside the sealing ring, which is screwed fast to the housing.

The purpose of the present invention is to provide a simpler and less expensive arrangement for axially securing a sealing ring in a seat.

This is achieved according to the invention by virtue of the fact that the internal lateral surface of the seat is provided with at least one annular groove which has at least one sharp side edge.

Quite surprisingly is has been found that the bead which is formed in the groove as the material in the elastic ring is deformed when the sealing ring is pressed into its seat, in conjunction with the sharp side edge of the groove, is sufficient to securely fix the sealing ring against overpressure of the order of 1 bar on that side of the sealing ring facing away from the sharp edge.

In a preferred embodiment of a sealing ring seat according to the invention, the groove has at least an essentially radial surface terminating in a sharp edge and an opposite surface gently inclined relative to the inner lateral surface. This provides the least possible resistance to pressing the sealing ring into the seat, at the same time as the resistance to axial displacement in the opposite direction will be maximal.

Tests performed have shown that it is sufficient if the axial extent of the groove be approximately 20–30% of the axial length of the inner lateral surface of the seat and the depth of the groove be approximately 5–7% of said axial length. This makes milling very simple with a minimum of material waste.

IN THE DRAWINGS

FIG. 1 shows a longitudinal section through a portion of a housing holding a sealing ring; and FIG. 2 is an enlargement of the circled fragment of FIG. 1.

In the FIG. 1, the numeral 1 designates a portion of a housing, in which an output shaft 2 is rotatably mounted in a manner not shown in more detail here. The housing 1 can be the housing of a transmission, for example a reversing gear for a marine motor installation, in which there is overpressure in the interior 3 of the housing. A conventional sealing ring, generally designated 4, is forced into a seat in the housing. The seat is limited by an inner lateral surface 5, which in the example shown is cylindrical, and a radial abutment surface 6 which determines the inner axial position of the sealing ring 4.

The sealing ring 4, which in the example shown is a conventional sealing ring, comprises a stiffener ring 7 of metal with a cylindrical portion 8 and a radial flange portion 9. A body 10 of elastic material is vulcanized to the ring 7 and comprises a cylindrical portion 11, surrounding the cylindrical portion 8 of the ring 7, and a radial portion 12 which terminates in a first and a second lip 13 and 14, respectively, the latter of which is pressed against the shaft 2 by an annular helical spring 15.

According to the invention, and as shown in FIG. 2, a groove, generally designated 20, is disposed in the cylindrical lateral surface 5 of the seat. The groove 20 has a radial side wall 21, which, together with the surface 5, forms a sharp edge 22. There is a rounded bottom portion 23 between the wall 21 and a wall portion 24 which is gently inclined relative to the surface 5 and has a gentle transition into the surface 5. The angle of incline α of the wall portion 24 relative to the surface 5 is circa 15° in the example. The axial extent a of the groove is approximately 20–30% of the axial length c of the seat surface 5 and the depth b of the groove is approximately 5–7% of said axial length.

When the sealing ring is forced into the space surrounded by the surface 5, a bead 25 is formed in the cylindrical portion 11 of the sealing ring, and said bead swells into the groove 20. The gently inclined wall surface 24 of the groove will enable the seating ring to be forced in easily, and the sharp edge 22 on the outside of the bead 25 will contribute to axially fixing the sealing ring with a force which can resist overpressure of the order of magnitude of 1 bar in the space 3. The invention eliminates the need for additional locking means on the outside of the sealing ring, and this reduces the axial length of the housing 1, and this is of significance in all installations in which space is limited, for example in marine engine compartments.

What is claimed is:

1. In combination, a seat for a sealing ring, and a sealing ring seated in said seat, the seat having an internal lateral surface having an annular groove which has a sharp side edge on one side and is inclined at an angle of about 15° on the side opposite said sharp side, the sealing ring comprising a ring of stiff material surrounded by a ring of elastic material, said ring of elastic material having an outer surface in contact with said internal lateral surface, said outer surface of said ring of elastic material when undeformed being cylindrical, said internal lateral surface and said ring of elastic material when seated in said internal lateral surface having an interference fit with said internal lateral surface such that a portion of the elastic material of said ring of elastic material is displaced by said interference fit to form a bead on the external lateral surface of the ring of elastic material, said bead protruding into said annular groove.

2. The structure set forth in claim 1, wherein the axial extent of the groove is approximately 20–30% of the axial length of the inner lateral surface of the seat and the depth of the groove is approximately 5–7% of said axial length.

3. The structure claimed in claim 1, wherein the groove is located approximately in the middle of the axial extent of said inner lateral surface of the seat.

4. The structure claimed in claim 1, wherein the sealing ring has an axial extent no greater than the axial extent of said internal lateral surface.

5. The structure set forth in claim 1, wherein said annular groove has a rounded bottom portion which joins a radial side wall which joins said internal lateral surface to create said sharp side edge.

6. The structure set forth in claim 5, wherein said inclined side has a smooth transition to said internal lateral surface.

7. The structure set forth in claim 5, wherein said rounded bottom portion has a smooth transition to said inclined side.

8. A seat for an elastic sealing ring, said seat comprising:
an internal lateral surface for seating a sealing ring; and
an annular groove in said internal lateral surface, said groove having a radial side wall which joins said internal lateral surface to create a sharp side edge on one side and having a gently inclined side opposite said sharp side which smoothly transitions to said internal lateral surface, said annular groove having an axial extent which is approximately 20–30% of an axial length of said internal lateral surface.

9. The seat of claim 8, wherein said inclined side is inclined at an angle of about 15°.

10. The seat of claim 8, wherein said groove has a rounded bottom portion which smoothly joins said radial side wall is arcuate and said inclined side.

11. The seat of claim 8, wherein said annular groove has a depth of approximately 5–7% of said axial length.

12. In combination, a seat for a sealing ring, and a sealing ring seated in said seat, the seat having an internal lateral surface having an annular groove which has a rounded bottom portion with joins a radial side wall which joins said internal lateral surface to create a sharp side edge on one side, said rounded bottom portion smoothly joining a gently inclined side opposite said sharp side, said inclined side smoothly transitioning to said internal lateral surface, the sealing ring comprising a cylinder of elastic material having an outer surface in contact with said internal lateral surface, said internal lateral surface and said cylinder of elastic material when seated in said internal lateral surface having an interference fit such that a portion of the elastic material of said cylinder of elastic material is displaced by said interference fit to form a bead which protrudes into said annular groove, wherein the axial extent of the groove is approximately 20–30% of the axial length of the inner lateral surface of the seat and the depth of the groove is approximately 5–7% of said axial length.

13. In combination, a seat for a sealing ring, and a sealing ring seated in said seat, the seat having an internal lateral surface having an annular groove which has a rounded bottom portion with joins a radial side wall which joins said internal lateral surface to create a sharp side edge on one side, said rounded bottom portion smoothly joining a gently inclined side opposite said sharp side, said inclined side smoothly transitioning to said internal lateral surface, the sealing ring comprising a cylinder of elastic material having an outer surface in contact with said internal lateral surface, said internal lateral surface and said cylinder of elastic material when seated in said internal lateral surface having an interference fit such that a portion of the elastic material of said cylinder of elastic material is displaced by said interference fit to form a bead which protrudes into said annular groove, wherein said inclined side is inclined at an angle of about 15°.

* * * * *